(12) United States Patent
Peng

(10) Patent No.: US 9,390,103 B2
(45) Date of Patent: Jul. 12, 2016

(54) INFORMATION SEARCHING METHOD AND SYSTEM BASED ON GEOGRAPHIC LOCATION

(71) Applicant: Alibaba Group Holding Limited, George Town (KY)

(72) Inventor: Yi Peng, Hangzhou (CN)

(73) Assignee: Alibaba Group Holding Limited (KY)

( * ) Notice: Subject to any disclaimer, the term of this patent is extended or adjusted under 35 U.S.C. 154(b) by 360 days.

(21) Appl. No.: 13/892,855

(22) Filed: May 13, 2013

(65) Prior Publication Data

US 2013/0311511 A1 Nov. 21, 2013

(30) Foreign Application Priority Data

May 15, 2012 (CN) .......................... 2012 1 0151265

(51) Int. Cl.
*G06F 17/30* (2006.01)
(52) U.S. Cl.
CPC ...... *G06F 17/30241* (2013.01); *G06F 17/3087* (2013.01)
(58) Field of Classification Search
CPC ................. G06F 17/30241; G06F 17/3087
USPC ........................................... 707/724
See application file for complete search history.

(56) References Cited

U.S. PATENT DOCUMENTS

| | | | |
|---|---|---|---|
| 6,108,650 A * | 8/2000 | Musk | H04W 4/02 |
| 7,412,202 B2 | 8/2008 | Gutta et al. | |
| 8,359,300 B1 * | 1/2013 | Shin | 707/706 |
| 8,589,069 B1 * | 11/2013 | Lehman | 701/438 |
| 2005/0065959 A1 * | 3/2005 | Smith | G06F 17/3087 |
| 2005/0278309 A1 | 12/2005 | Evans et al. | |

(Continued)

FOREIGN PATENT DOCUMENTS

| | | |
|---|---|---|
| CN | 101114294 | 1/2008 |
| EP | 2306333 | 4/2011 |

(Continued)

OTHER PUBLICATIONS

PCT Written Opinion for PCT/US2013/040954, dated Nov. 15, 2014.*

(Continued)

*Primary Examiner* — Mahesh Dwivedi
(74) *Attorney, Agent, or Firm* — Van Pelt, Yi & James LLP

(57) ABSTRACT

Embodiments of the present application relate to an information searching method based on geographic location, an information searching system based on geographic location, and a computer program product for searching for information based on geographic location. An information searching method based on geographic location is provided. The method includes acquiring need information and geographic location information corresponding to a mobile terminal user, looking up a preset geographic location zone threshold value based on the need information, preconfigured mappings of preset geographical location zone information and category information, and searching for target information corresponding to the need information based on the geographic location information of the mobile terminal user and the preset geographic location zone threshold value.

14 Claims, 5 Drawing Sheets

(56) References Cited

U.S. PATENT DOCUMENTS

| | | |
|---|---|---|
| 2006/0074883 A1 | 4/2006 | Teevan et al. |
| 2006/0101005 A1* | 5/2006 | Yang .................... G06F 17/3087 |
| 2008/0005104 A1 | 1/2008 | Flake et al. |
| 2008/0234931 A1* | 9/2008 | Wang et al. .................... 701/209 |
| 2010/0036806 A1* | 2/2010 | Lam .................... G06F 17/3087 707/706 |
| 2010/0161215 A1* | 6/2010 | Karani ........................... 701/204 |
| 2011/0106429 A1* | 5/2011 | Poppen et al. ................. 701/201 |
| 2012/0023088 A1* | 1/2012 | Cheng et al. ................... 707/707 |
| 2013/0110822 A1* | 5/2013 | Ikeda .................. G06F 17/3087 707/722 |

FOREIGN PATENT DOCUMENTS

| | | |
|---|---|---|
| JP | 2001016158 | 1/2001 |
| JP | 2003021530 | 1/2003 |
| JP | 2007278702 | 10/2007 |
| WO | 2007056450 | 5/2007 |

OTHER PUBLICATIONS

Search Report for PCT/US2013/040954, dated Nov. 21, 2013.*
Article entitled "Google's Mobile Search Ads "Open Now" Filter", dated Feb. 25, 2011, by McGee.*
WO 2011/137125, Published on Nov. 3, 2011, by Mo et al.*

* cited by examiner

INFORMATION SEARCHING METHOD AND SYSTEM BASED ON GEOGRAPHIC LOCATION

CROSS REFERENCE TO OTHER APPLICATIONS

This application claims priority to People's Republic of China Patent Application No. 201210151265.2 entitled AN INFORMATION SEARCHING METHOD AND SERVER BASED ON GEOGRAPHIC LOCATION, filed May 15, 2012 which is incorporated herein by reference for all purposes.

FIELD OF THE INVENTION

The present application relates to an information searching method and system based on geographic location.

BACKGROUND OF THE INVENTION

Due the expansion of mobile devices, mobile Internet, and wireless Internet, electronic shopping has begun to transition from traditional wired web shopping to wireless web shopping. In other words, users that shopped via the Internet through a wired connection, now shop using a mobile terminal connected to the Internet through a wireless connection. For example, a user can shop over the Internet by logging onto a shopping website using a mobile terminal, or a user can shop over a wireless Internet connection using a shopping website client via an intelligent device such as a tablet computer.

As Internet shopping over a wireless connection has developed, websites providing shopping over a wireless connection are expected to provide users with a geographic location based store and product information searches or to proactively push some geographic location based products and store discounts. Thus, location based services (LBS) have become more popular. A location based service has two different meanings 1) determining the geographic location of a mobile device or user, or 2) providing various location related information services. For example, a service finds the current geographic location of a mobile device user or a wireless user, such as a Wi-Fi user. Subsequently, for example, within the 6,340 square kilometer limits of Shanghai, the service searches for the names and addresses of hotels, movie theaters, libraries, gas stations, etc. located within a 1 km range of the current location of the mobile device user or the wireless user. Therefore, the location based service uses a wireless communication network (such as a 3G network or a CDMA network) or an external positioning method (such as a global positioning service (GPS)) or a Wi-Fi access point to acquire the location information.

However, when the existing LBS applications search for nearby merchants or products, the LBS applications only recommend products or merchants based on a fixed distance. In other words, the existing LBS applications draw a circle based on the user's current geographic location as its center and use a fixed distance as the circle's radius. Subsequently, the existing LBS applications display or push, to the user, products or merchants within the geographic area encompassed by the circle. Therefore, unless the user's geographic position changes, the user can only view information within a certain surrounding area in a fixed manner. For example, the surrounding area could be set to 500 meters. Typically, no surrounding area information would ever be provided for someone living in a remote suburb; the surrounding area information provided for someone living near a big box retailer would always be product information from within the same big box retailer, and the surrounding area information provided for someone living near a women's apparel store would always be related to women's apparel. Consequently, existing geographic location based services are often limited to providing information within a fixed area based on the user's geographic location, and the existing geographic location based services cannot flexibly provide information that, based on different user needs, would be highly satisfactory to the users. In other words, the geographic location based services typically cannot effectively provide product and merchant information dynamically for wireless shopping.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The present application, by looking up geographic location zone threshold values corresponding to need information, provides target information within the geographic location zone threshold values to cause a mobile terminal user to be no longer subject to the mobile terminal user's geographic location limits. The information that the mobile terminal user receives is information within a certain range, and the mobile terminal user can receive different types of information from within different ranges based on the need information.

Figure 1:
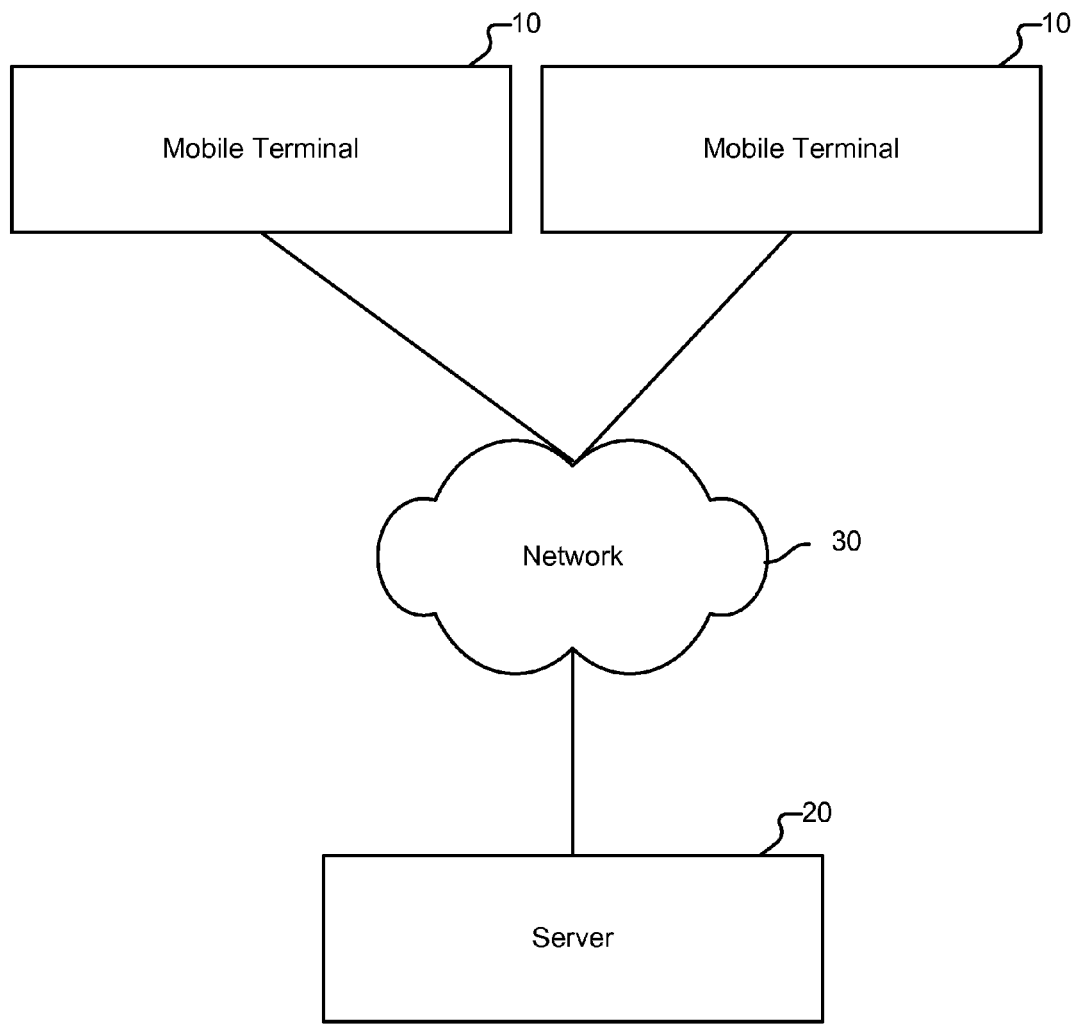
FIG. 1 is a diagram of the system architecture illustrating an embodiment of a geographic location based information searching system.

FIG. 1 is a diagram of the system architecture illustrating an embodiment of a geographic location based information searching system. The system 100 includes a plurality of mobile terminals 10 communicating with a server 20 via the mobile Internet or a wireless network 30. A user (i.e., the mobile terminal user) uses a mobile terminal 10 to log onto a shopping website provided by the server 20 to shop.

When browsing the shopping website and searching for nearby merchant or product information, the user transmits a location service request through the mobile terminal 10. The location service request is received by the server 20. The location service request is used to acquire user presented need information. For example, the need information includes various kinds of product or merchant information. The need information is used to find corresponding preset geographic location zone threshold values from a database. For example, the need information is related to apparel, food, and entertainment, and the server 20 locates the preset geographic location zone threshold values corresponding to the need information. For example, the preset geographic location zone threshold values are 500 m, 100 m, 2,000 m, etc. A database on the server 20 stores network retailer related information. For example, the network retailer related information includes retailer provided object contact information, hours of operation, and physical shop information corresponding to the network retailer. The database also stores a geographic location zone threshold value correspondence table, specific geographic location information for the physical shop of each store, and product information. The server 20 uses geographic location information received from the mobile terminal 10 and the geographic location zone threshold values to search the database for target information corresponding to each piece of need information. For example, the target information includes information related to apparel, food, entertainment, or any combination thereof. The server transmits the target information to the mobile terminal, which displays the target information. For example, when the geographic location zone threshold value is found for "apparel," the geographic location zone threshold value corresponds to 2,000 meters. Accordingly, the server searches the database for geographic location information of physical shops within the geographic location zone threshold value corresponding to the radius and the user's geographic location information corresponding to the center. In the event that the physical shop information has been found within the surrounding area, the physical shop information is provided to the mobile terminal 10 of the user.

In the present application, the mobile terminals refer to various kinds of mobile terminals that use wireless communication networks of wireless carriers. For example, a mobile terminal accesses a shopping website server via a mobile network to shop. The mobile terminals include mobile phones, personal communication service (PCS) phones, or cordless phones. In addition, the mobile terminals relate to the various kinds of mobile terminals capable of using a wireless network, e.g. Wi-Fi, making use of wireless Internet to access shopping website servers to shop. For example, the mobile terminals include notebooks with Wi-Fi access, mobile phones such as iPhones, iPads, and personal digital assistants (PDA) that have Wi-Fi access.

Figure 2:
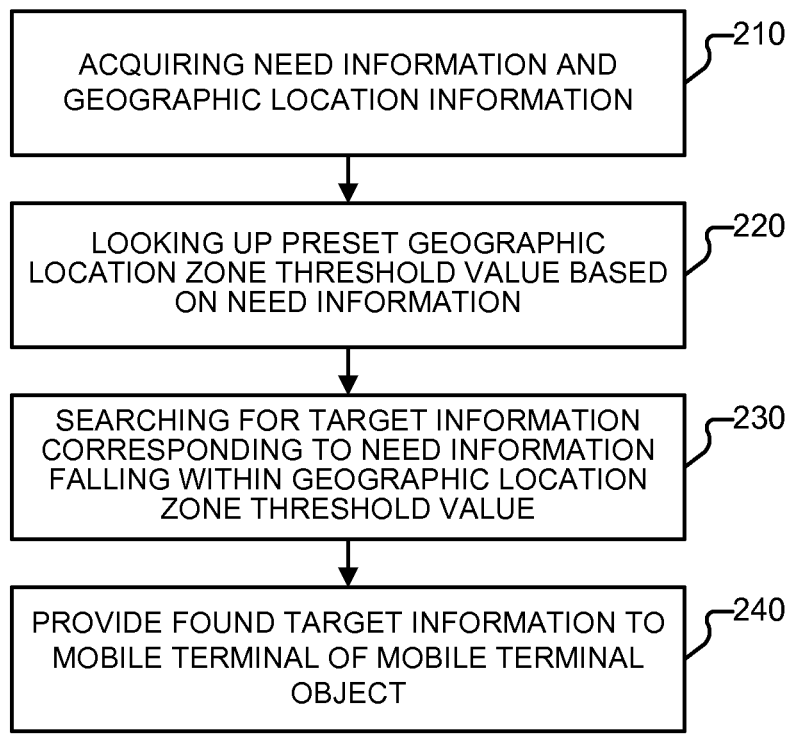
FIG. 2 is a diagram illustrating an embodiment of a geographic location based information searching method.

FIG. 2 is a diagram illustrating an embodiment of a geographic location based information searching method. The method 200 can be implemented by a server 500 discussed in FIG. 5. The method 200 performs the following:

In 210, a server acquires need information and geographic location information corresponding to a mobile terminal user.

Before the server acquires the need information and the geographic location information, the server receives a location service request sent by a user from a mobile terminal, such as an iPhone. For example, after the user logs onto the shopping website client, the user browses a web page and clicks on "Nearby," "Vicinity," "Right next to me," or a similar location service initiating keyword displayed on the web page. The mobile terminal sends the location service request to the server. The location service request includes keyword information such as "Nearby," "Vicinity," or "Right next to me." The location services corresponding to the keywords "Nearby," "Vicinity," and "Right next to me" are positioning services that are preset by the server and provided to the user. The location services are used to indicate the need information corresponding to a first terminal.

After the server receives the location service request, the server extracts a keyword and, based on the keyword, search preset need information of the user in a database. The preset need information relates to products or merchants which the user currently prefers (i.e., an indicated product type inclination). For example, the type of product information that user A currently prefers is information relating to beverages. In the event that the relevant merchant or product information is found in the database, the need information serves as query index information. For example, a default setting between the server and the user exists, and in the event that the user transmits a location service request including keyword information such as "Nearby," "Vicinity," or "Right next to me," the found need information of the user related to the location service request corresponds to the merchant categories of entertainment, shopping, or dining, or the product information relating to beverages, apparel, etc. The database of the server, in addition to having various types of aforementioned information, also includes need information corresponding to users when the server provided location services (such as by clicking the keywords "Nearby," "Vicinity," or "Right next to me") are sent. The need information having been predetermined in advance by the server and the users of each mobile terminal. Therefore, the need information of the user relates to a product or merchant information predetermined in advance by the server and the user. For example, the predetermined need information is sent to the user in response to a location service request issued after selecting or clicking "Nearby." After the server receives the location service request sent by the mobile terminal, and after the server dissects the location service request and extracts the keyword "Nearby," the server retrieves the predetermined need information from the local database, for example, nearby merchant information: dining, entertainment, and shopping.

In some embodiments, before the server acquires the need information, the server also performs the following:

The server receives the location service request transmitted by the mobile terminal. The location service request includes a keyword.

Accordingly, the receiving of the need information corresponding to the mobile terminal user operation includes the server extracts the keywords from the location service request, and searches the local database to acquire the need information corresponding to the mobile terminal user.

In some embodiments, the user also browses nearby product, merchant, and discount information displayed on the web page using the product browsing functions provided on the client. The user sends a location service request including a category. For example, the user selects an information category list on the client web page, opens the list, browses Apparel—Women's Apparel—Sweaters on the list, clicks the "Sweaters" category and sends a location service request to the server. At this point, the location service request includes the keyword "sweaters." After receiving the service location request including the keyword "sweaters," the server analyzes the location service request and identifies the keyword "sweaters." The server regards the keyword as the user's need information, i.e., sweaters. The need information indicates that the user currently wishes to receive information relating to products in the sweaters category.

In some embodiments, before the server acquires the need information, the server also performs the following:

The server receives the location service request sent by the mobile terminal. The location service request includes a keyword.

Accordingly, the acquiring of the need information relating to the mobile terminal user includes extracting the keyword from the location service request, establishing the keyword as the need information relating to the mobile terminal user.

In some embodiments, the user also uses a search box provided on a client page to enter a keyword for product or merchant information in the vicinity of the user's geographic location. For example, the user enter a keyword related to the product information, such as "pure peach juice" or "Coca Cola" into the search box and clicks the "Search" button to transmit the location service request. In the event that the server receives the location service request, the server analyzes the location service request identifying the keyword. The server regards the identified keyword as need information. The need information is interpreted as the user currently desires to acquire information relating to a product in the "Pure Peach Juice" category or to acquire product information relating to the "Coca Cola" brand.

In some embodiments, before the server acquires the need information, the server also performs the following:

The server is configured to receive the location service request sent by the mobile terminal. The location service request includes a keyword.

Accordingly, the acquiring of the need information corresponding to the mobile terminal user comprises extracting the keyword from the location service request, and establishing the keyword as need information corresponding to the mobile terminal user.

Therefore, the need information corresponding to the user is included in the location service request initiated by the user so that the server does not need to acquire the need information from a database.

In other words, after the server receives the location service request, the server is configured to acquire the need information from a local database or acquire the need information from the location service request that was issued by the user. In some embodiments, the server acquires the user's geographic location from another server, such as an existing positioning server, that provides geographic location information.

In 220, the server looks up the preset geographic location zone threshold value based on the need information.

In some embodiments, in the event that the server acquires the need information, for example, information for various categories such as Entertainment, Shopping, and Dining retailers or information relating to various product categories such as Beverages, Apparel, or Digital, the server looks up the corresponding geographic location zone threshold values based on the need information. For example, the keywords in the received location service request are "Nearby," "Right next to me," and "Vicinity." In the event that the need information is Dining and Movies, the server acquires information on merchants in the merchant categories of Dining and Movies. The server determines the finest category level to which the information belongs, using the need information as query index information and using the correspondence table in the database (see Tables 1 and 2 shown below). The category level geographic location zone threshold value correspondence table is organized based on category levels to which specific products belong. For example, the category level geographic location zone threshold value correspondence table is organized based on category levels to which merchants belong, as shown in Tables 1 and 2 below. For example, the server determines to which level 1 category "Dining" belongs in Table 2. The server also determines to which level 2 category "Dining" belongs. In the event that the server does not find a corresponding level 2 category in Table 2, the finest category level to which "Dining" belongs is the level 1 category. Thus, the acquired geographic location zone threshold value corresponding to Dining is 1,500 meters, as shown in Table 2. The server determines to which level 1 category "Movies" belongs in Table 2. In this example, "Movies" belongs to the level 1 category of "Recreation and Entertainment." The server also determines which level 2 category Movies belongs. In this example, Movies belongs to "Movie Theaters". The server determines to which level 3 category Movies belongs. In this case the server does not find any level 3 categories because the finest category level to which Movies belongs is the level 2 category level. Thus, the acquired geographic location zone threshold value corresponding to Movies is 300 meters. The need information is used to look up the preset geographic location zone threshold value (1,500 meters or 300 meters) corresponding to the need information.

In some embodiments, for example, the user browses a category list on a shopping website. The category list is provided by the shopping website to help the user navigate amongst a vast number of merchandise. Each category in the list corresponds to certain products that belong to the category (e.g., as specified by the seller of the product or as automatically classified by the system according to known classification techniques). The user selects a category such as General Merchandise or Sweaters on the shopping website, and issues a location service request. The need information is "General Merchandise" or "Sweaters." At this point, the server, using the need information, searches for information on products in the product categories of "General Merchandise" or "Sweaters" and the correspondence table in the database (see Tables 1 and 2), determines the finest category level to which the need information belongs. For example, the server determines that level 1 is the finest category level to which the need information "General Merchandise" belongs. The server acquires the corresponding geographic location zone threshold value of 1,500 meters based on the level 1 category of General Merchandise. In the event that the need information is Sweaters, the server determines that the finest category level to which the information belongs is level 3. The server acquires the corresponding geographic location zone threshold value of 2,000 meters based on the level 3 category of Sweaters because 2,000 meters is the corresponding geographic location zone threshold value found in Table 1.

In some embodiments, the user also uses a user interface tool provided on a shopping website client (e.g., a search box displayed on client software such as a mobile application or a web browser) to search for product information that the user is searching for. For example, the user enters product information keywords "pure peach juice" into the search box and causes the mobile terminal to issue a location service request. The location service request includes the keywords "pure peach juice," which correspond to the need information. After receiving the request, the server analyzes the location service request and identifies the keywords to acquire the need information, in this case "pure peach juice." The server searches for information relating to products in the "Pure Peach Juice" category. The server determines the level 1 category to which "pure peach juice" belongs based on correspondence tables in the database and uses the need information "pure peach juice" as query index information. The correspondence tables relate to Tables 1 and 2. For example, the need information "pure peach juice" belongs to the level 1 category General Merchandise. The server then determines the level 2 category to which the need information "pure peach juice" belongs. For example, "pure peach juice" belongs to the level 2 category Beverages. Subsequently, the server determines the level 3 category to which "pure peach juice" belongs. In the event that the server fails to find a corresponding level 3 category, the finest category level to which "pure peach juice" belongs is level 2. Therefore, the server is configured to select the geographic location zone threshold value corresponding to category level 2, e.g., 300 m, for Beverages because Beverages is a level 2 category. In other words, geographic location zone threshold values corresponding to the records in the second row of Table 1 correspond to the need information and serve to provide the geographic area corresponding to the target information beverage of the need information, pure peach juice.

After the keywords "pure peach juice" in the location service request are identified, the obtained product category corresponding to the need information that corresponds to the user is a single product category. After analyzing and identifying the keywords, the server obtains need information belonging to a plurality of product categories. For example, after receiving a location service request issued by a mobile terminal, the server acquires the need information "Coca Cola" based on the keywords in the location service request. In this case, the need information relates to a specific brand name, and the server is unable to confirm which category of product information the need information relates to because more than one product categories exist, for example product categories related to Coca Cola for carbonated beverages or Coca Cola-logo apparel. In this case, the server first searches the product information database for product information relating to "Coca Cola." The server classifies the product information. The classified Coca Cola relates to the beverage Coca Cola or Coca Cola apparel. In other words, for keywords such as "Coca Cola" which do not allow the server to define the product category, the server determines from the database what product categories could be related, for example, Coca Cola beverages or Coca Cola apparel. Then, the server uses the possibly occurring product categories to serve as the need information again. Subsequently, using the correspondence table (see Tables 1 and 2) in the database, the server determines the finest category level to which the need information belongs. In some embodiments, the server determines that the need information belongs to the level 1 category General Merchandise. Then the server determines to which level 2 category Coca Cola belongs, for example to the level 2 category Beverages. Then the server determines to which level 3 category Coca Cola belongs, for example the level 3 category Carbonated Beverages. Therefore, the server determines that the category level corresponding to the finest category level to which Coca Cola belongs is level 3, Carbonated Beverages, and the server selects the geographic location zone threshold value corresponding to the level 3 category. Also, the server determines that the need information "Coca Cola" also belongs to the level 1 category Apparel based on the product categories to which the need information "Coca Cola" might belong. The level 1 category Apparel corresponds to the category level of the finest category level to which the need information "Coca Cola" belongs. Therefore, the server also selects the geographic location zone threshold value corresponding to the category level 1 Apparel. In the example, the server looks up the preset geographic location zone threshold values corresponding to the need information based on the need information. The preset geographic location zone threshold values correspond to values 100 meters and 1,000 meters.

Therefore, after looking up the preset geographic location zone threshold value corresponding to the need information based on the category level and before searching for target information corresponding to the need information falling within the geographic location zone threshold value using the geographic location information of the mobile terminal user and the preset geographic location zone threshold value, the server searches the database for product information based on the need information, classifies the product information into a category, and acquires the product type-related need information based on the category.

Therefore, the looking up of the preset geographic location zone threshold value corresponding to the need information based on the need information includes determining the category level of the finest category level to which the information belongs based on the need information, and looking up the preset geographic location zone threshold value corresponding to the category level of the finest category level so that the preset geographic location zone threshold value corresponds to the need information.

In some embodiments, priority is given by the database to storing the geographic location zone threshold values corresponding to various product categories or merchant information, i.e. to the category levels that the need information belongs, as shown in Tables 1 and 2. The geographic location zone threshold values corresponding to need information has personalized settings corresponding to users. For example, users A and B are users with different authority levels. The authority level of user A is level one, and the authority level of user B is level two. The geographic location zone threshold values set for users A and B are different because different threshold values are assigned to different authority levels. In other words, a user-customized correspondence table recorded in the database exists. The correspondence table recorded in the database, for example, records user information, categorized content, and corresponding geographic location zone threshold values. The categorized content includes product or merchant information divided into category levels 1, 2 and 3. In some embodiments, the geographic location zone threshold values corresponding to various product or merchant information, i.e., need information, is uniformly set with respect to users.

In some embodiments, the server pre-categorizes the product or merchant information on a plurality of levels based on the characteristics or natures of products or merchants that have been uploaded to the server database when offering products for sale. Moreover, each category is subdivided, and products and merchants is divided into category levels belonging to a plurality of levels. In other words, product attributes is acquired from the database, and the products are divided into categories, and geographic location zone threshold values corresponding to the levels of the divided categories are set up and saved. For example, product information relating to General Merchandise could be subdivided into categories of 3 levels. For example, General Merchandise related product information could be divided as follows: a level 1 category corresponds to General Merchandise, which is subdivided into multiple level 2 categories, one of which is Beverages, which is in turn subdivided into multiple level 3 categories, one of which is Carbonated Beverages. Other examples of level 3 categories include Pure Squeezed Juice, Baby Fruit Drinks, etc. In some embodiments, product information are divided into more than three levels. The number of levels is based on actual need. Therefore, after the server acquires the need information of the current user, for example, the user voluntarily issues a message indicating the desire to see location information on the product Carbonated Beverages. In this case, the server looks up the finest category levels based on the Carbonated Beverage need information. For example, the finest category level is a level 3 category whose corresponding geographic location zone threshold value is 100 meters. In the event that the user browses the "Vicinity" position information service, the need information acquired by the server will be preset product or merchant information, such as General Merchandise, and the category level of the finest category level to which General Merchandise belongs is level 1. The corresponding geographic location zone threshold value is 500 meters. For example, 500 meters is the geographic location zone threshold value recorded in row 3 in Table 1. Therefore, the preset geographic location zone threshold values are set for different category levels after the product or merchant information registered on the server has been categorized based on characteristics and natures of existing products or merchants. In other words, different category levels correspond to different geographic location zone threshold values. In another example, the server categorizes products and/or merchants based on the characteristics and natures of the products and/or the merchants. The products and/or merchants are categorized based on existing categorization rules by analyzing product and/or merchant information provided by shops already registered on the server. The division of product or merchant information into category levels is understood by one of ordinary skill. Thus, an explanation of the division of product or merchant information into category levels is omitted for conciseness.

In some embodiments, in the correspondence table including category levels and geographic location zone threshold values, the category levels are divided into a plurality of levels. The finer the category level is, the finer the distance of the geographic location zone threshold value provided will be. For example, in the event that the category level of the finest category level to which the need information (for example, "bicycle pump") belongs is General Merchandise (a level 1 category), the geographic location zone threshold value corresponding to General Merchandise is 500 meters. As another aspect, in the event that the category level of the finest category level to which the need information (for example, "Coca Cola") belongs is Carbonated Beverages (a level 3 category), the geographic location zone threshold value corresponding to Carbonated Beverages is 100 meters. Therefore, it is possible to flexibly search for information based on the user's need information within a reasonable range of the user's geographic location, using the pre-established category level-geographic location zone threshold value correspondence table. For example, information within different geographic location zone threshold values are found for the different category levels to which different need information belongs. Thus, the conventional situation is avoided where information is provided only within one fixed range.

In some embodiments, the category level-geographic location zone threshold value correspondence table is organized based on category levels to which specific products belong. In some embodiments, the correspondence table is organized based on category levels to which merchants belong, as shown in Tables 1 and 2 below.

TABLE 1

Category level-geographic location zone threshold value correspondence table

| Level 1 Category | Level 2 Category | Level 3 Category | Zone threshold value | Example Radius |
|---|---|---|---|---|
| General Merchandise | Beverages | Carbonated Beverage | 100 m | A |
| General Merchandise | Beverages | | 300 m | |
| General Merchandise | | | 500 m | |
| Beauty and Hair Care | | | 1,000 m | B |
| Apparel | | | 1,000 m | |
| Apparel | Women's Apparel | Sweater | 2,000 m | C |
| Digital | Notebook | | 4,000 m | D |
| Jewelry | Diamonds | | 5,000 m | E |
| Auto Accessories | Seat | | 10,000 m | F |

TABLE 2

Category level-geographic location zone threshold value correspondence table

| Level 1 Category | Level 2 Category | Zone threshold value |
|---|---|---|
| Dining | | 1,500 m |
| Shopping | Supermarkets | 1,000 m |
| Shopping | Department Stores | 5,000 m |
| Recreation and Entertainment | Movie Theaters | 300 m |
| Recreation and Entertainment | Cafes | 500 m |
| Recreation and Entertainment | Scenic Sites/Excursions | 20,000 m |

Figure 4:
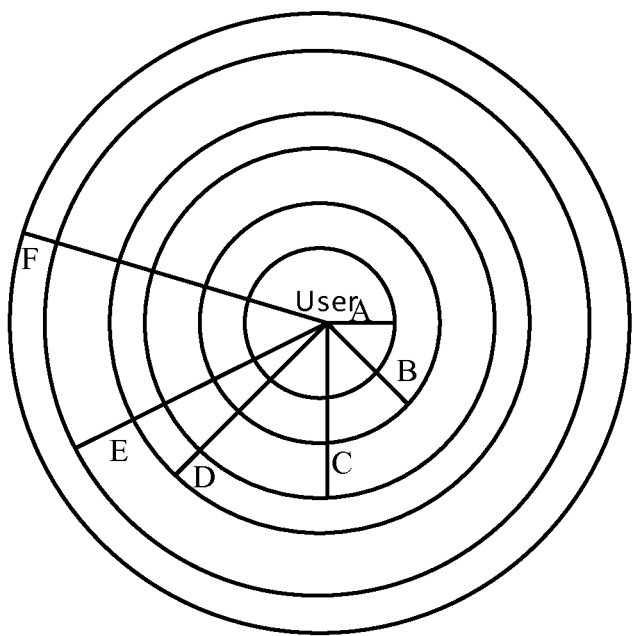
FIG. 4 is a diagram illustrating an embodiment of product information relating to different geographic location zone threshold value ranges.

Referring to Table 1, FIG. 4 is a diagram illustrating an embodiment of product information relating to different geographic location zone threshold value ranges. For example, the target information is as follows: Carbonated Beverages, radius A; Sweater, radius C, etc. In this example, radius A corresponds to 100 Meters and radius C corresponds to 2,000 Meters. The category level of the finest category level to which the need information for a user belongs is used to select the target information within the geographic location zone threshold value range. The target information is provided to the client. Therefore, users are flexibly provided information. The users are not always forced to receive the target information that is only within a fixed range centered on their geographic location.

In some embodiments, a user sets the geographic location zone threshold values corresponding to the category levels on the server via the client. In other words, the server also receives a request to revise the geographic location zone threshold value issued by a mobile terminal. The user uses the mobile terminal to set a specific geographic location zone threshold value to acquire the desired target information. For example, in the event that the user is in a bustling area with lots of merchants, the user decreases the geographic location zone threshold value to get a beverage. The decreased zone threshold value makes locating a beverage more convenient for the user. After the server receives the request to revise the geographic location zone threshold value, the server stores the revised value in the correspondence table.

In 230, the server searches for target information corresponding to the need information and falling within the geographic location zone threshold value based on the geographic location information of the mobile terminal user and the preset geographic location zone threshold value.

In some embodiments, the server uses the acquired geographic location information from the user's mobile terminal and looks up the geographic location zone threshold value. For example, the geographic location zone threshold value for Dining is 1,500 meters and the geographic location zone threshold value for Movies is 300 meters. The server takes the geographic location corresponding to the user's geographic location information to be the center of a circle and the geographic location zone threshold value of 1,500 meters to be the radius of the circle, and selects, within the circle, target information of dining merchants corresponding to the need information Dining In other words, the server acquires the geographic location information on physical shops relating to Dining within the circle. The server takes the geographic location corresponding to the user's geographic location information as the center of a circle and takes the geographic location zone threshold value of 300 meters as the radius of the circle. The server selects, from within the circle, the target information for Movie Theaters corresponding to the need information from the database. In other words, the server acquires the geographic location information of physical shops providing Movies within the circle, and the server provides to the client the geographic location information on the shops that fall within the circle. The server also provides the shop information of the physical shops. In some embodiments, in addition to the geographic location information and shop information described above, the target offer information sent to the client also includes product information.

In some embodiments, after receiving geographic location information and shop information for the plurality of physical shops found, the server arranges the shops into a list based on a preset sequence, for example, in the list, Dining occurs before Movies. The server sends the list to the client, or the server forms a shop list ordered based the geographic distances recorded in the geographic location information. In some embodiments, the geographic location information is sent to the client in the form of marker points on a map. The mapping of marker points is understood by one of ordinary skill in the art and an explanation of the mapping of marker points is omitted for conciseness.

In some embodiments, the server uses the acquired geographic location information on the user's mobile terminal and the looked up geographic location zone threshold value (for example, the geographic location zone threshold value is 100 meters for Sweaters) as follows: the server takes the geographic location corresponding to the user's geographic location information to be a center of a circle and the geographic location zone threshold value of 100 meters to be the radius of the circle. Within the circle, the target information for Sweaters corresponding to the need information Sweaters is selected from the database. In other words, the server acquires the geographic location information on physical shops within the circle. After conducting a search, the server provides to the client the geographic location information on the shops that fall within the circle. The server also provides the shop information for the physical shops that provide sweaters. In some embodiments, in addition to the geographic location information and shop information described above, the target offer information sent to the client also includes product information, such as a brief description of a sweater product.

In some embodiments, the server uses the acquired geographic location information of the user's mobile terminal and the looked up geographic location zone threshold value (for example, the geographic location zone threshold value is set at 300 meters for Pure Peach Juice) using a process that is the similar to the process described above. The server selects the target information Pure Peach Juice corresponding to the need information from the database, and provides the client with the geographic location information of the shops falling within the geographic location zone threshold value. The server also provides the shop information for these physical shops. In some embodiments, in addition to the geographic location information and shop information described above, the target offer information sent to the client also includes product information, such as a brief description of pure peach juice.

In one example, the geographic location zone threshold values set for Coca Cola are 100 meters and 1,000 meters. The server takes the geographic location corresponding to the user's geographic location information to be the center of a circle and the geographic location zone threshold values of 100 meters and 1,000 meters as the radii of the circles. Within the circle, the server selects the target information corresponding to the need information. In other words, the server provides the client with the geographic location information of the shops that fall within the circle. In some embodiments, the server also provides shop information for the physical shops.

After receiving geographic location information and shop information for a plurality of found physical shops, the server arranges the shops into a list based on a preset sequence, for example, Beverages before Apparel, and sends the list to the client, or the server forms a shop list ordered based on the geographic distances recorded in the geographic location information. The server also displays shop information including product information corresponding to the need information. The information is also sent to the client in the form of marker points on a map. For example, existing marker point information includes shop information for product information corresponding to the need information.

In some embodiments, a shop offering products on a shopping website, in addition to using computers and other wired equipment to conduct input management of shop information, also uses a mobile communication terminal, such as a 3G handset, for inputting product information in the shops. The shop uses a communication module and an information acquiring module of the mobile communication terminal (for example, a videotaping module) to acquire characteristic information on products in a shop. Through the communication module of the mobile communication terminal, the communication module acquires product information corresponding to the characteristic information. In some embodiments, entering additional product information is also possible. The product information formed is sent through a mobile communications network to a server where the merchant shops are located. In some embodiments, the relevant shop information of a network shop is stored in the server database. The shop information includes telephone contact information, hours of operation, information on the physical shop corresponding to the network shop, geographic location information relating to the physical shop, the geographic location zone threshold value correspondence table, and product information. In some embodiments, the product information includes names, codes, summary information, and attributes of each kind of product.

The product information and the shop information is saved in the same data table of a server database. In some embodiments, the product information and the shop information is saved in different databases or in two data tables on a single large database. In some embodiments, for example, a product information data table stores the product related information saved by the server. In some embodiments, the product information includes product code information, product summary information, and product attributes. Product code information is automatically generated by the server for a product when the product information is entered by the offering object. The product code information is used for labeling a product. The shop information data table of the server stores shop names, product code information for products provided by the shops, contact information, hours of operation, geographic location information on the physical shops corresponding to the network shops, geographic location information on the physical shops, the geographic location zone threshold value correspondence table, and voice transmission modes at the offered object of the shop. For example, in the voice transmission mode, users are capable of calling the shopkeeper. In other words, product information and shop information is separately stored in two data tables in one database. Because the product information data table does not store the contact information of the offering object corresponding to the product information, the hours of operation of the offering object, the physical shop information corresponding to the product, and other such information, the server extracts this information from the shop information data table based on correspondences between the product information data table and the shop information data table.

In some embodiments, the product information and the shop information are stored in two different databases on a server, for example, a product information database and a shop information database.

The server database records geographic location information of physical shops corresponding to the shops, and the geographic location information of these physical shops is acquired from a Lightweight Directory Access Protocol (LDAP) server on an existing positioning platform using recorded physical shop address information.

In some embodiments, in 240, the server provides the found target information to a mobile terminal of the mobile terminal user.

In one example, the server regards the products or merchants within an area having the geographic location of the mobile terminal as the center of a circle and the geographic location zone threshold value as a radius of the circle. The products or merchants within the area correspond to target information selections. The server then provides the target information to the mobile terminal of the user and displays the target information on the client of the mobile terminal, for example, as a list or as marker points on a map.

Thus, in the event that a user who is using a wireless network or a mobile network via the user's mobile terminal is conducting wireless shopping, makes use of geographic location to acquire the physical locations of the shops of the products or merchants that the user is interested in, the physical locations are acquired based on different zone threshold values corresponding to different need information. Therefore, the wireless shopping desires of the user are more flexibly met when the user searches physical shops in the vicinity of the user.

Figure 3:
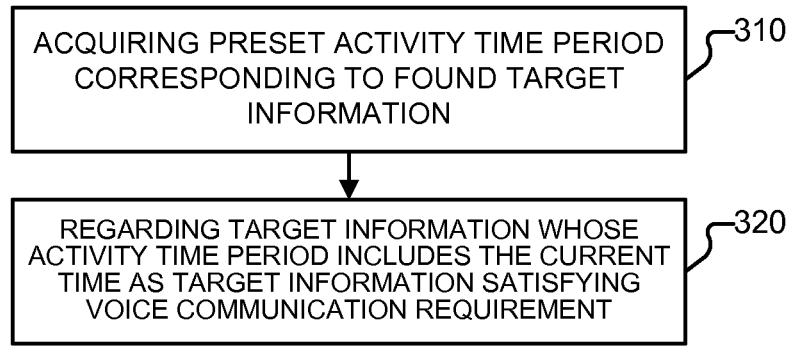
FIG. 3 is a diagram illustrating an embodiment of a method of searching for target information.

FIG. 3 is a diagram illustrating an embodiment of a method of searching for target information. The method 300 is an implementation of the operation 230 of FIG. 2. The method 300 comprises:

In 310, the server acquires a preset activity time period corresponding to the found target information.

In 320, the server regards the target information whose activity time period includes the current time as the target information satisfying the voice communication requirement.

In some embodiments, the regarding of the target information whose activity time period includes the current time as the target information satisfying the voice communication requirement includes: determining whether the current time is within the activity time period of the target information. In the event that the current time is within the activity time period, the target information is target information that meets the voice communication requirement. Meeting voice communication requirements means permitting voice communications during the activity time period.

In some embodiments, the server selects target information for offered objects that are in a voice communication mode based on: whether a merchant is in a voice communication mode, the merchant is among product or merchant information of the target information found to fall within the geographic location zone threshold values corresponding to the need information. The server, after again finding the target information in the voice communication mode, provides the target information to the mobile terminal client. In some embodiments, the server provides the target information in the voice communication mode to the mobile terminal client and also provides the remainder of the target information provided by the offered object to the mobile terminal client. In some embodiments, the server sequences the target information. For example, the server sequences the target information in the voice communication mode at the top of the list and sequences the remaining target information at the bottom of the list. Subsequently, the server sends the sequenced target information list to the mobile terminal client, where the mobile terminal client displays the sequenced target information list to the user.

In some embodiments, by employing the method 300 described above, the server selects shops that are in voice transmission mode and display information to the user. Accordingly, the user is provided with a better experience.

In some embodiments, operation 240 is replaced with: providing the target information provided by the offered objects whose voice transmission mode is a voice communication mode, as found through an additional search, to the mobile terminal of the mobile terminal user.

In some embodiments, operation 240 is replaced with taking the target information provided by the offered objects whose voice transmission mode is a voice communication mode, as found through a search, and the remainder of the target information provided by the offered objects, as found through a search, and sequencing the target information and then providing the sequenced target information to the mobile terminal of the mobile terminal user.

The above examples primarily describe how the user, through the shopping website client on the user's mobile terminal, sends a location service request to the server and searches or acquires the physical location of the user's need information. In some embodiments, the server proactively pushes the physical locations related to various types of information. For example, at a certain time, the server will proactively inform users product discount information based on physical location information for some users. This product discount information is sent to mobile terminal clients. For example, before the server acquires the need information, the server proactively acquires various users that require pushing. The server then acquires from the database the need information corresponding to each user. For example, in the event that the server pushes Dining related discount information to a set of objects, the operations will be the same as for the embodiment described above. The server pushes all the merchant information that falls within these geographic location zone threshold values to the user's clients based on the geographic location information of each user and the geographic location zone threshold values that are set for Dining In some embodiments, the user's client also customizes user's need information. For example, in the event that User A's need information is Dining and Apparel, then User A acquires the geographic location zone threshold value that was acquired for the category level of the finest category level to which the need information belongs. The server provides the Dining and Apparel target information that falls within the geographic location zone threshold value to the client of the customized service user. In addition, in some embodiments, users also customize the geographic location zone threshold values corresponding to individual pieces of need information that the users desires. For example, a request to revise the geographic location zone threshold value is sent to the server. Therefore, saving different geographic location zone threshold values for different users and for the same category level is possible so that different users acquires product or merchant information within different geographic location zone threshold value ranges.

Figure 5:
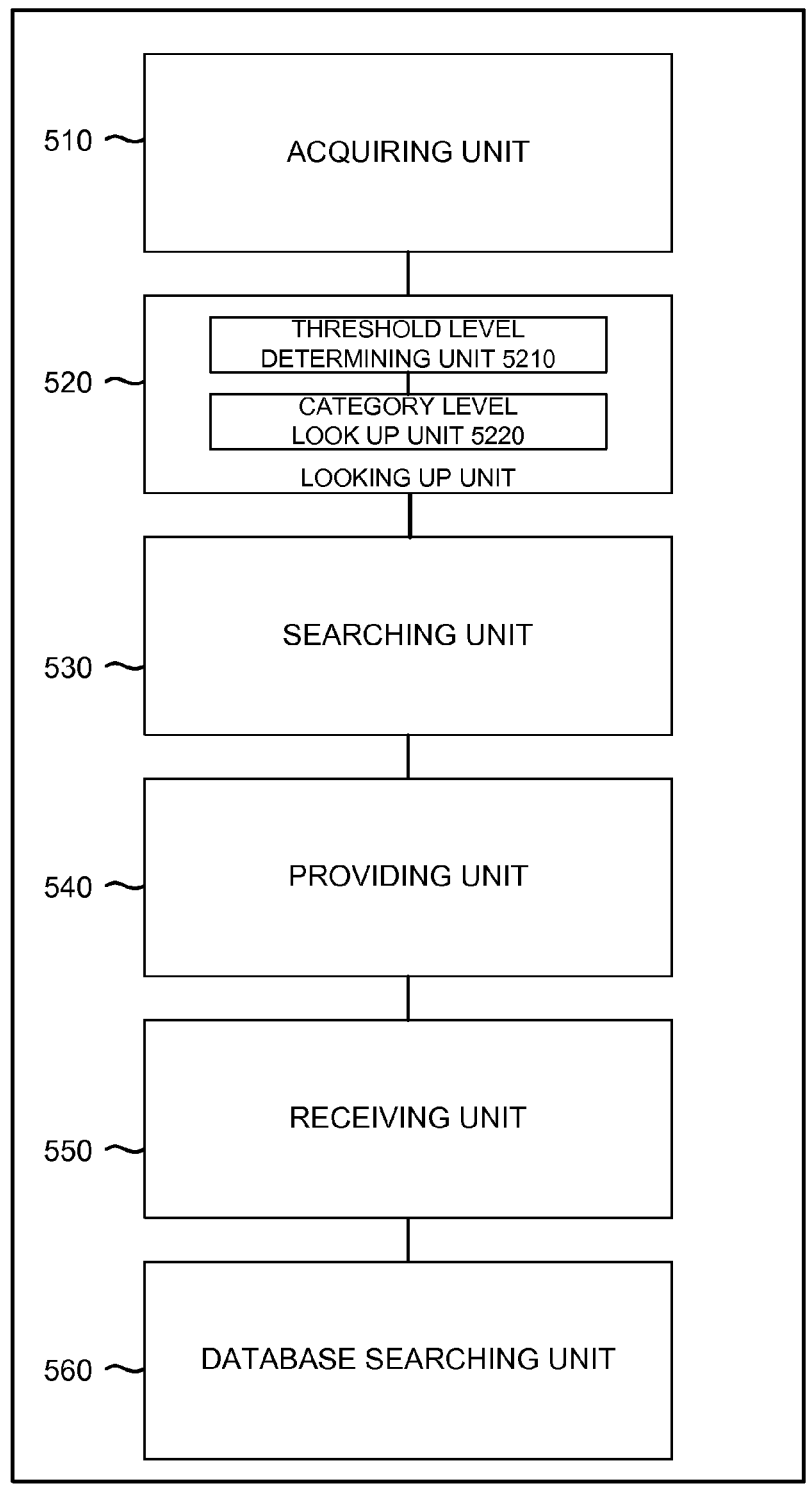
FIG. 5 a structural diagram illustrating an embodiment of a geographic location based information searching system.

FIG. 5 is a structural diagram illustrating an embodiment of a geographic location based information searching system. This system 500 includes an acquiring unit 510, a looking up unit 520, a searching unit 530, a providing unit 540, a receiving unit 550, and the database searching unit 560.

The acquiring unit 510 acquires need information and geographic location information corresponding to a mobile terminal user.

The looking up unit 520 looks up the preset geographic location zone threshold value corresponding to the need information based on the need information.

The searching unit 530 searches for target information corresponding to the need information and falls within the geographic location zone threshold value based on the geographic location information of the mobile terminal user and the preset geographic location zone threshold value.

In some embodiments, the receiving unit 550 receives a location service request sent by a mobile terminal user. The location service request includes keywords.

The acquiring unit 510 further extracts keywords from the location service request and queries a local database based on the keywords so as to acquire the need information corresponding to the mobile terminal user, or establishes the keywords as the need information corresponding to the mobile terminal user.

In some embodiments, the database searching unit 560 searches in a database for product information corresponding to the need information based on the need information, and acquires the product type related need information corresponding to the need information based on a classifying of the product information into categories. For example, in the event that the keywords are Coca Cola or some other brand name that does not indicate a product type, the database searching unit 560 further acquires need information relating to a product type. For example, one may reference the descriptions in the above embodiments.

The providing unit 540 provides the selected target information to the mobile terminal of the mobile terminal user.

In some embodiments, the receiving unit receives a location service request message sent by the mobile terminal. For example, the client proactively issues a location service request as a result of the user activating the positioning service client of the mobile terminal, or as a result of the user clicking a function button such as "Nearby," "Vicinity," or "Right next to me" on the positioning service client. In some embodiments, the issuing of the location service request causes the mobile terminal to send a location service request to the positioning server. In such situations, after receiving the location service request, the system 500 finds the need information preset for the client in the database. For example, a default setting exists between the system and the user. In the event that the user issues a location service request, the need information of the user to which the location service request is directed is merchant category information (Entertainment, Shopping, or Dining) or product information of various types such as Beverages, Apparel, or Digital. In another example, the user browses some products, merchants, discounts, and other such information in the vicinity based on browsing functions provided on the positioning service client. The user issues location service requests according to categories. For example, the user selects an information category list on the client page, browses Apparel—Women's Apparel—Sweaters, clicks the "Sweaters" category, and issues a location service request to the system. At this point, the location service request includes the information of the user, for example, the product category information: "Sweaters." Therefore, the need information corresponding to the user is category information that the system agreed upon in advance with the user; or the information corresponding to the user is included in the location service request issued by the user.

After receiving the location service request, the acquiring unit 510 acquires need information from the database or acquires need information from the location service request that was sent, and acquires the user's geographic location from a server, such as an existing positioning server, that provides geographic location information.

In some embodiments, the looking up unit 520 includes a category level determining unit 5210 and a threshold value look up unit 5220.

The category level determining unit 5210 determines the category level of the finest category level to which the need information belongs.

The threshold value look up unit 5220 looks up the preset geographic location zone threshold value corresponding to the category level of the finest category level based on the category level of the finest category level so as to achieve a correspondence with the need information.

In some embodiments, in the event that the acquiring unit 510 acquires the need information, the acquiring unit 510 looks up the corresponding geographic location zone threshold values based on the need information. The need information is Entertainment, Shopping, Dining, and various other merchant category information or various types of product information. The product information is Beverages, Apparel, and Digital. For example, the user browses shopping website categories such as General Merchandise or Sweaters and issues a location service request. The need information is General Merchandise or Sweaters. At this point, the category level determining unit 5210 determines the category level of the finest category level to which the need information belongs based on the need information. Examples of category levels are shown in a correspondence table (see Tables 1 and 2) in the database. For example, General Merchandise belongs to a level 1 category. The threshold value look up unit 5220 acquires the geographic location zone threshold value corresponding to 1,500 meters based on the level 1 category General Merchandise. In the event that the need information is Sweaters, the category level determining unit 5210 determines that the category level of the finest category level to which need information belongs is the level 3 category Sweaters. The threshold value look up unit 5220 acquires the geographic location zone threshold value corresponding to 2,000 meters based on the level 3 category Sweaters.

In another example, the user uses a search box provided on a client accessing a website to search for product information that the user desires. For example, the user enters "pure peach juice" in the search box. At this point, a location service request is sent via the mobile terminal. This location service request includes "pure peach juice" as the need information. After the receiving unit 550 receives the location service request, the acquiring unit 510 acquires "pure peach juice," as the need information. First of all, using the correspondence table in the database, the category level determining unit 5210 of the looking up unit 520 determines to which level 1 category "pure peach juice" belongs. For example, the "pure peach juice" belongs to the level 1 category General Merchandise. The category level determining unit 5210 then determines the level 2 category to which "pure peach juice" belongs. For example, the "pure peach juice" belongs to the level 2 category Beverages. Then, the category level determining unit 5210 determines to which level 3 category "pure peach juice" belongs. In the event that the category level determining unit 5210 fails to find a corresponding level 3 category, the category level of the finest category level to which "pure peach juice" belongs is level 2. Therefore, the threshold value look up unit 5220 selects a geographic location zone threshold value corresponding to category level 2, for example, 300 meters for Beverages. Beverages are a level 2 category. In other words, the recorded geographic location zone threshold values corresponding to the records in the second row of Table 1 correspond to the need information and provide the geographic area corresponding to the target information beverage of the need information, pure peach juice.

In some embodiments, priority is given in the database to storing the geographic location zone threshold values corresponding to various product categories or merchant information, for example, to the category levels which the need information belongs, as shown in Tables 1 and 2. These geographic location zone threshold values corresponding to need information have personalized settings for users. For example, Users A and B are users with different authority levels. Therefore, the geographic location zone threshold values set for users A and B are different. In other words, a user-customized correspondence table recorded in the database exists. The database correspondence table, for example, records user information, categorized content such as product or merchant information divided into category levels 1, 2 and 3, and corresponding geographic location zone threshold values. In some embodiments, the geographic location zone threshold values corresponding to various product or merchant information, for example, need information, is uniformly set with respect to users.

First of all, the system uses the characteristics or natures of products or merchants that might appear as a basis for pre-categorizing the product or merchant information on a plurality of levels. Products and merchants are divided into categories levels that belong to the plurality of levels. For example, product information pertaining to General Merchandise are subdivided into 3 category levels. For example, product information related to General Merchandise are divided into level 1 category General Merchandise, level 2 category Beverages, and level 3 category Carbonated Beverages. Moreover, the level 3 category includes a plurality of level 3 categories. For example, the level 3 categories includes Pure Squeezed Juice, Baby Fruit Drinks, etc. Therefore, after the system acquires the need information of the current user. For example, the user voluntarily issues a message desiring to acquire geographic location information on the product Carbonated Beverages. In this case, the system looks up the finest category levels to which the product Carbonated Beverages based on the Carbonated Beverage need information. The geographic location zone threshold value corresponding to the level 3 category of the Carbonated Beverage is 100 meters. In the event that the user browses the "Vicinity" position information service, the need information acquired by the system will be preset product or merchant information, such as General Merchandise, and the category level of the finest category level to which General Merchandise belongs is level 1. The corresponding geographic location zone threshold value is 500 m, which is, for example, the geographic location zone threshold value recorded in row 3 in Table 1. Therefore, the preset geographic location zone threshold values are set for different category levels after the product or merchant information stored on the system has been categorized based on the characteristics and natures of existing products or merchants. In other words, different category levels correspond to different geographic location zone threshold values. In some embodiments, the system carries out categorization based on the characteristics and natures of products or merchants. Product or merchant information provided by shops already registered on the system is categorized in accordance with existing categorization rules. The division of product or merchant information into category levels is understood by one of ordinary skill and is omitted for conciseness.

In the correspondence table (kept within the database) that relates to category levels belonging to need information and to geographic location zone threshold values, the category levels are divided into a plurality of levels. The finer the category level is, the finer the distance of the geographic location zone threshold value is provided. For example, in the event that the finest category level to which the need information (for example, "bicycle pump") belongs is General Merchandise (a level 1 category), the geographic location zone threshold value corresponding to General Merchandise is 500 meters. As an aspect, in the event that the finest category level to which the need information (for example, "Coca Cola") belongs is Carbonated Beverages (a level 3 category), the geographic location zone threshold value corresponding to Carbonated Beverages is 100 meters. Therefore, based on the category level-geographic location zone threshold value correspondence table which is preset in in the database, flexible use of the user's need information for finding offers of information within a reasonable range of the user's geographic location is possible. For example, offers of information within different geographic location zone threshold values is found for the different category levels to which different need information belongs. Thus, conventional offering of information within one fixed range is avoided.

In some embodiments, the searching unit 530 uses the geographic location corresponding to the user's geographic location information to be the center of a circle and the geographic location zone threshold value, for example of 100 meters, to be the radius of the circle, within which all corresponding need information—the target information of each product—is selected. For example, the geographic location zone threshold value is set to 100 meters for Sweaters. FIG. 3 illustrates information within different threshold values. For example, the target information is set as follows: Carbonated Beverages—radius A, Sweater—radius C, etc. The finest category level to which the need information for a user belongs is used to select the target information within the geographic location zone threshold value range. The selected target information is provided to the client. Therefore, users are provided with information flexibly. Users do not always receive only the target information within a fixed range centered on their geographic location.

In some embodiments, the user sets the geographic location zone threshold values corresponding to the category levels on the server via the client. In other words, the receiving unit 550 also receives a request to revise the geographic location zone threshold value issued by a mobile terminal. In other words, the user sets a specific threshold value on a mobile terminal client so as to acquire the desired target information. For example, in the event that the user is in an area of high commercial activity, the user reduces the zone threshold value for beverages. The reduction increases convenience for the user. After the system receives the request to revise the geographic location zone threshold value, the system stores the revised value in the correspondence table.

The searching unit 530 searches the products or merchants within an area having the geographic location of the mobile terminal as the center of the area and the geographic location zone threshold value as a radius of the area for potential target information selections. The providing unit 540 then provides the target information to the mobile terminal of the user and displays the target information on the client of the mobile terminal. For example, the target information is presented on the client as a list or as marker points on a map. The display on the client of product related geographic location information is the same thing as providing the geographic locations of specific physical shops that sell these products. The display of geographic location information relating to specific physical shops on a user's mobile terminal client is understood by one of ordinary skill and a further discussion is omitted for conciseness.

In some embodiments, the acquiring unit 510 also acquires the target information that satisfies voice communication requirements from the found target information and acquires a preset activity time period corresponding to the found target information.

The acquiring unit 510 also includes target information whose activity time period includes the current time as the target information that satisfies voice communication requirements.

The searching unit 530 also searches for the target information provided by the offered objects whose voice transmission mode is a voice communication mode.

In other words, the acquiring unit 510 further selects target information for the offered objects that are in a voice communication mode based on: whether the merchants are in a voice communication mode, these merchants being among product or merchant information of the target information falling within the geographic location zone threshold values corresponding to the need information. The system, after finding this target information that is in voice communication mode, provides the target information to the mobile terminal client. In some embodiments, the system provides the target information that is in voice communication mode to a mobile terminal client and also provides the remainder of the target information provided by the offered object to the mobile terminal client. In some embodiments, the server ranks the information in sequence. The target information that is in voice communication mode is ranked at the top of the list and the remaining target information is ranked at the bottom of the list. Then, the acquiring unit 510 sends the sequenced target information list to the mobile terminal client, where the sequenced target information list is displayed to the user.

Therefore, information is flexibly provided to the users. The users are not required to receive the target information that is within a fixed range centered on their geographic location.

The units described above can be implemented as software components executing on one or more general purpose processors, as hardware such as programmable logic devices and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An information searching method based on geographic location, comprising:
  acquiring, using one or more processors, need information and geographic location information corresponding to a mobile terminal user;
  looking up, using the one or more processors, a preset geographic location zone threshold value based on the need information, preconfigured mappings of preset geographical location zone information and category information, comprising:
    determining a category level of the finest category level to which the need information belongs; and
    looking up the preset geographic location zone threshold value corresponding to the category level of the finest category level;
  searching for, using the one or more processors, target information corresponding to the need information based on the geographic location information of the mobile terminal user and the preset geographic location zone threshold value;
  acquiring target information that satisfies a voice communication requirement from the found target information;
  sequencing the found target information based on target information that satisfies the voice communication requirement and target information that does not satisfy the voice communication requirement, comprising:
grouping the target information that satisfies the voice communication requirement; and
grouping the target information that does not satisfy the voice communication requirement; and
sending the sequenced found target information to the mobile terminal user to be displayed, wherein the mobile terminal user is to display the grouped target information that satisfies the voice communication requirement above the grouped target information that does not satisfy the voice communication requirement.

2. The information searching method based on geographic location as desrcibed in claim 1, further comprising, before the acquiring of the need information and the geographic location information corresponding to the mobile terminal user, receiving a location service request sent by the mobile terminal user, the location service request including a keyword indicating the need information corresponding to a first terminal.

3. The information searching method based on geographic location as described in claim 2, wherein the acquiring of the need information corresponding to the mobile terminal user comprises:
extracting the keyword from the location service request; and
querying a local database of a server to acquire the need information corresponding to the mobile terminal user based on the keyword.

4. The information searching method based on geographic location as described in claim 2, wherein the acquiring of the need information corresponding to the mobile terminal user comprises:
extracting the keyword from the location service request; and
establishing the keyword as the need information corresponding to the mobile terminal user.

5. The information searching method based on geographic location as described in claim 1, further comprising after the looking up of the preset geographic location zone threshold value corresponding to the need information based on the geographic location information of the mobile terminal user and the preset geographic location zone threshold value and before the searching for the target information corresponding to the need information falling within the geographic location zone threshold value:
searching in a database for product information based on the need information;
classifying the found product information into a category; and
acquiring product type-related need information corresponding to the need information based on the category.

6. The information searching method based on geographic location as described in claim 1, wherein the acquiring of the target information that satisfies the voice communication requirements from the found target information comprises:
acquiring a preset activity time period corresponding to the found target information; and
regarding the target information having an activity time period including a current time as the target information that satisfies the voice communication requirement.

7. The information searching method based on geographic location as described in claim 1, further comprising:
receiving a request sent by a mobile terminal of the mobile terminal user to revise the geographic location zone threshold value.

8. The information searching method based on geographic location as described in claim 1, further comprising, after the searching for the target information corresponding to the need information based on the geographic location information of the mobile terminal user and the preset geographic location zone threshold value:
providing the found target information to a mobile terminal of the mobile terminal user.

9. The information searching method based on geographic location as described in claim 1, wherein the looking up of the preset geographic location zone threshold value further comprises:
determining a number of pieces of target information located within the found preset geographic location zone threshold value; and
in the event that the number of pieces of target information exceeds a preset target information threshold value, decreasing the preset geographic location zone threshold value.

10. The information searching method based on geographic location as described in claim 1, further comprising:
determining whether to push product discount information related to the need information to the mobile terminal user based on the geographic location information corresponding to the mobile terminal user; and
in the event that the mobile terminal user is determined to be pushed the product discount information, pushing the product discount information to the mobile terminal user.

11. An information searching system based on geographic location, comprising:
at least one processor configured to:
acquire need information and geographic location information corresponding to a mobile terminal user;
look up a preset geographic location zone threshold value based on the need information, preconfigured mappings of preset geographical location zone information and category information, comprising to:
determine a category level of the finest category level to which the need information belongs; and
look up the preset geographic location zone threshold value corresponding to the category level of the finest category level;
search for target information corresponding to the need information based on the geographic location information of the mobile terminal user and the preset geographic location zone threshold value;
acquire target information that satisfies a voice communication requirement from the found target information;
sequence the found target information based on target information that satisfies the voice communication requirement and target information that does not satisfy the voice communication requirement, comprising to:
group the target information that satisfies the voice communication requirement; and
group the target information that does not satisfy the voice communication requirement; and
send the found sequenced target information to the mobile user to be displayed, wherein the mobile terminal user is to display the grouped target information that satisfies the voice communication requirement above the grouped target information that does not satisfy the voice communication requirement; and a memory coupled to the at least one processor and configured to provide the at least one processor with instructions.

12. The information searching system based on geographic location as described in claim 11, wherein the at least one processor is configured to:
   before the acquiring of the need information and the geographic location information corresponding to the mobile terminal user, receive a location service request sent by the mobile terminal user, the location service request including a keyword indicating the need information corresponding to a first terminal.

13. A computer program product for searching for information based on geographic location, the computer program product being embodied in a non-transitory computer readable storage medium and comprising computer instructions for:
   acquiring need information and geographic location information corresponding to a mobile terminal user;
   looking up a preset geographic location zone threshold value based on the need information, preconfigured mappings of preset geographical location zone information and category information, comprising:
      determining a category level of the finest category level to which the need information belongs; and
      looking up the preset geographic location zone threshold value corresponding to the category level of the finest category level;
   searching for target information corresponding to the need information based on the geographic location information of the mobile terminal user and the preset geographic location zone threshold value;
   acquiring target information that satisfies a voice communication requirement from the found target information;
   sequencing the found target information based on target information that satisfies the voice communication requirement and target information that does not satisfy the voice communication requirement, comprising:
      grouping the target information that satisfies the voice communication requirement; and
      grouping the target information that does not satisfy the voice communication requirement; and
   sending the found sequenced target information to the mobile user to be displayed, wherein the mobile terminal user is to display the grouped target information that satisfies the voice communication requirement above the grouped target information that does not satisfy the voice communication requirement.

14. The computer program product for searching for information based on geographic location as described in claim 13, further comprising, before the acquiring of the need information and the geographic location information corresponding to the mobile terminal user, receiving a location service request sent by the mobile terminal user, the location service request including a keyword indicating the need information corresponding to a first terminal.

\* \* \* \* \*